(12) United States Patent
Coudurier et al.

(10) Patent No.: US 9,307,292 B2
(45) Date of Patent: *Apr. 5, 2016

(54) OVERLAY OF VISUAL REPRESENTATIONS OF CAPTIONS ON VIDEO

(71) Applicant: Hulu, LLC, Santa Monica, CA (US)

(72) Inventors: Baptiste Coudurier, Los Angeles, CA (US); Robert A. Post, Marina Del Rey, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,418

(22) Filed: Jan. 3, 2014

(65) Prior Publication Data

US 2014/0123193 A1 May 1, 2014

Related U.S. Application Data

(63) Continuation of application No. 13/488,860, filed on Jun. 5, 2012, now Pat. No. 8,655,148.

(51) Int. Cl.
| | |
|---|---|
| H04N 5/92 | (2006.01) |
| H04N 9/80 | (2006.01) |
| H04N 7/16 | (2011.01) |
| H04N 21/4722 | (2011.01) |
| H04N 5/445 | (2011.01) |
| H04N 21/488 | (2011.01) |
| H04N 21/63 | (2011.01) |
| H04N 21/658 | (2011.01) |
| H04N 21/482 | (2011.01) |

(52) U.S. Cl.
CPC ....... *H04N 21/4722* (2013.01); *H04N 5/44513* (2013.01); *H04N 21/482* (2013.01); *H04N 21/4884* (2013.01); *H04N 21/631* (2013.01); *H04N 21/6581* (2013.01); *H04N 21/6582* (2013.01); *H04N 2005/44526* (2013.01)

(58) Field of Classification Search
USPC ................................. 386/239–248
See application file for complete search history.

(56) References Cited

U.S. PATENT DOCUMENTS

| | | |
|---|---|---|
| 5,805,153 A | 9/1998 | Nielsen |
| 2003/0095135 A1 | 5/2003 | Kaasila et al. |
| 2005/0078948 A1* | 4/2005 | Yoo et al. .......... 386/95 |
| 2005/0084248 A1* | 4/2005 | Yoo et al. .......... 386/95 |
| 2007/0154171 A1 | 7/2007 | Elcock et al. |
| 2007/0180486 A1 | 8/2007 | Yoon |

OTHER PUBLICATIONS

U.S. Appl. No. 13/488,860, filed Jun. 5, 2012 entitled "Picture Overlay of Captions on Video Via Out of Band Communication".

* cited by examiner

*Primary Examiner* — Hung Dang
(74) *Attorney, Agent, or Firm* — Fountainhead Law Group PC

(57) ABSTRACT

In one embodiment, a method receiving a request for a media program from a user device. The method then determines a set of visual representations of captions for the media program and determines video information for the media program. Visual representations from the set of visual representations of captions are sent with the video information over a network to the user device where text for the captions has been pre-rendered in the sent visual representations before sending of the visual representations to the user device. Also, the user device is configured to directly render and overlay a visual representation of a caption from the visual representations over a portion of the video information without rendering of the text for caption on the portion of the video information at the user device.

21 Claims, 4 Drawing Sheets

OVERLAY OF VISUAL REPRESENTATIONS OF CAPTIONS ON VIDEO

CROSS-REFERENCE TO RELATED APPLICATIONS

This application claims priority to U.S. patent application Ser. No. 13/488,860 filed Jun. 5, 2012 entitled "Picture Overlay of Captions on Video Via Out of Band Communication", which is incorporated by reference in its entirety for all purposes.

BACKGROUND

A user device may be used to play a video using a media player. For example, a server may stream a video to the user device. The device may render and display captions with corresponding video. For example, the captions may be subtitles for audio (e.g., spoken dialogue) associated with the video. In one example, a software renderer of the user device renders the text for the caption on the video being displayed. In this case, a server that is streaming the video to the user device sends a text file, timecodes, and text formatting metadata to the user device. The text file includes captions that are represented in text or a proprietary binary format. The timecodes indicate when to render the text. The text formatting metadata describes formatting used in rendering the text, such as font, location, and size. The software renderer on the user device then renders the text from the text file at corresponding timecodes using the formatting metadata to display the captions with the video.

Different types of user devices may be used by different users, and the different types of user devices may include different software renderers. The different software renderers may render the captions in different formats or in different locations. This may display the captions differently on different user devices. When trying to address problems with the display of the captions, it may be hard for a company to debug the problems because different types of devices render the captions differently. Thus, reproducing the problem may be difficult. Also, some software renderers may not be able to render some captions, such as a software renderer may not be able to render text vertically.

In another example, digital video disc (DVD) players display captions by displaying pictures of the captions with the video. The pictures of the captions are included in the same file with the video. For example, a DVD file may include video (V), audio (A), and captions (C). In this way, the video, audio, and captions are multiplexed together in the file. The DVD player then processes the file to display the video and the pictures of the captions together. For example, the information may be sent in the multiplex sequence of V, A, C, V, A, C, . . . , V, A, C. This sends the captions in-band with the video because the pictures of the captions are included in the same file with the video. Because the captures are included in the same file, when there are any changes to be made to the captions, then the DVD file needs to be changed. This is because the DVD file includes the captions multiplexed with the video and the audio. One change may be adding different languages for the captions. In this case, the DVD file may include the following information of: V, A, C, C (French), C (Spanish), C (Japanese), . . . . When a new language, such as Chinese, needs to be added for the captions, then the DVD file again needs to be changed to multiplex the Chinese captions into the file.

SUMMARY

In one embodiment, a method receiving a request for a media program from a user device. The method then determines a set of visual representations of captions for the media program and determines video information for the media program. Visual representations from the set of visual representations of captions are sent with the video information over a network to the user device where text for the captions has been pre-rendered in the sent visual representations before sending of the visual representations to the user device. Also, the user device is configured to directly render and overlay a visual representation of a caption from the visual representations over a portion of the video information without rendering of the text for caption on the portion of the video information at the user device.

In one embodiment, a non-transitory computer-readable storage medium is provided containing instructions, that when executed, control a computer system to be configured for: receiving a request for a media program from a user device; determining a set of visual representations of captions for the media program; determining video information for the media program; and sending visual representations from the set of visual representations of captions with the video information over a network to the user device, wherein text for the captions has been pre-rendered in the sent visual representations before sending of the visual representations to the user device and the user device is configured to directly render and overlay a visual representation of a caption from the visual representations over a portion of the video information without rendering of the text for caption on the portion of the video information at the user device.

In one embodiment, a method includes: sending, by a user device, a request for a media program to a server, the media program associated with a set of visual representations of captions; receiving, by the user device, visual representations of the set of visual representations of the captions with the video information over a network from a server; determining, by the user device, a visual representation of a caption to render from the received visual representations; and directly rendering and overlaying, by the user device, the visual representation of the caption over a visual representation of a portion of the video information without rendering of the text for caption on the visual representation of the portion of the video information at the user device, wherein text for the captions has been pre-rendered in the received visual representations before receiving of the visual representations at the user device.

The following detailed description and accompanying drawings provide a better understanding of the nature and advantages of the present invention.

DETAILED DESCRIPTION

Described herein are techniques for a video system for rendering captions using pictures. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
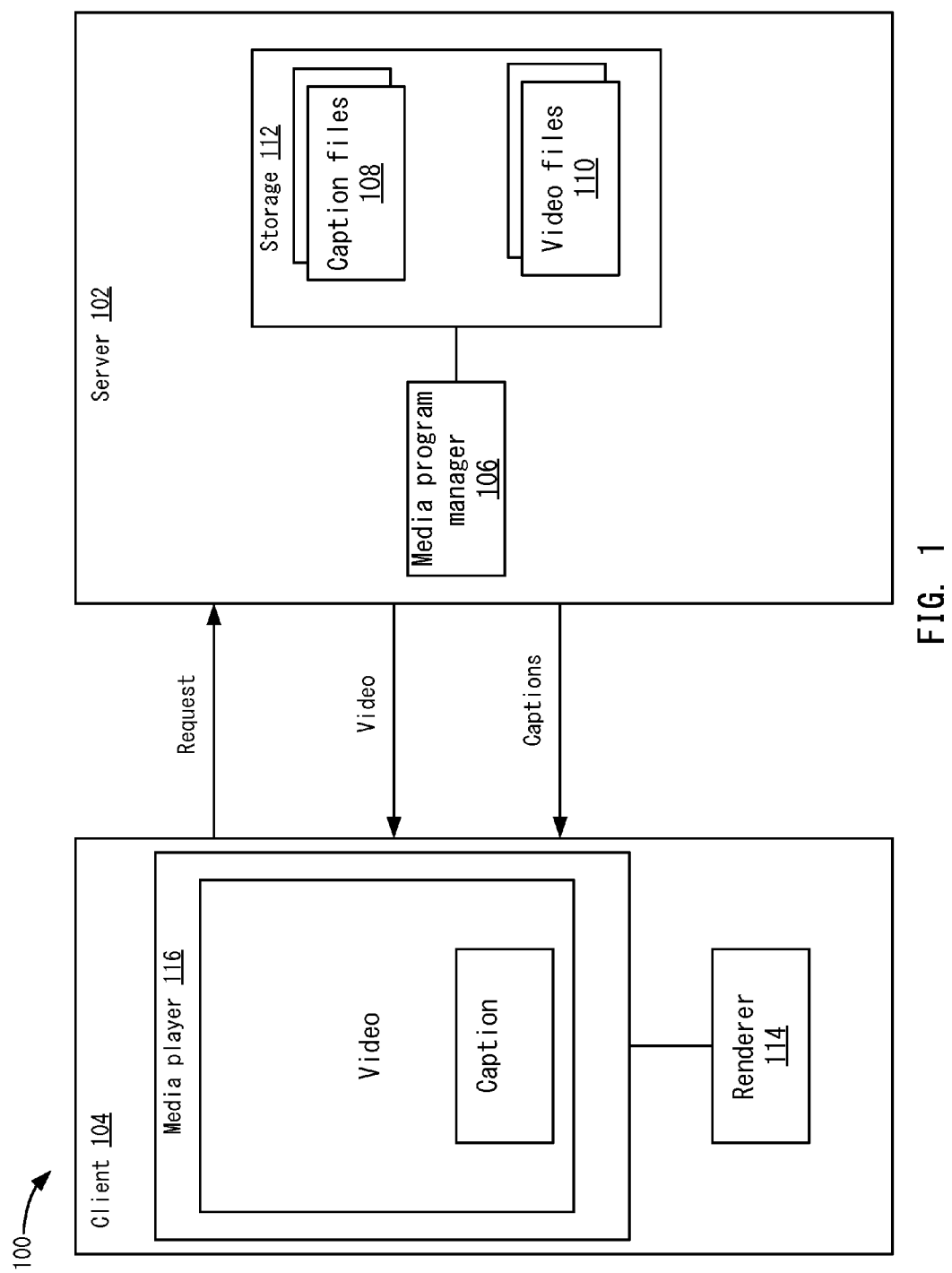
FIG. 1 depicts an example of a system for rendering videos with captions according to one embodiment.

FIG. 1 depicts an example of a system 100 for rendering videos with captions according to one embodiment. System 100 includes a server 102 and a user device 104. Although one server 102 and one user device 104 are shown, it will be understood that multiples instances of server 102 and user device 104 may be appreciated. Server 102 communicates with user device 104 over a network (not shown), such as the Internet or a wide area network (WAN).

User device 104 may be various devices that can play media programs. For example, user device 104 includes cellular phones, smart phones, tablet computers, laptop and desktop computers, televisions, etc. In one example, the media program is for a movie or a television show. The media program may include video, audio, and/or captions.

Server 102 sends media programs to user device 104. For example, user device 104 may request a media program and server 102 streams the media program to user device 104. The media program requested is associated with a specific video. Captions for that video are also provided. The captions may be text information that is associated with the video and/or audio. For example, the captions may be subtitles for the spoken dialogue of an audio track or may describe events occurring in the video.

Particular embodiments provide captions to user device 104 that are visual representations of the caption. For example, the visual representation is a pre-rendered image or picture of the text for the caption. The visual representation may be in different formats, such as portable network graphics (PNG) or joint photographic experts group (JPEG). The term picture will be used for discussion purposes, but other visual representations may be used.

In one embodiment, the pictures are pre-rendered on server 102 before sending to any user devices 104. Although server 102 is discussed as performing the pre-rendering, it will be understood that multiple servers may be used to perform the pre-rendering. Also, different servers 102 may be used to pre-render the pictures and then respond to requests for the media program. In one embodiment, a software renderer on server 102 receives a text file, timecodes, and text formatting metadata. As described above, the text file includes captions that are represented in text or a proprietary binary format. The timecodes indicate when the render the text. The text formatting metadata describes formatting used in rendering the text, such as font, location, and size. Server 102 processes the text file, timecodes, and text formatting metadata, and outputs pictures that include the text and a playlist that describes when to display the pictures. For example, if the caption is "The story begins with . . . ", a picture is rendered with the text "The story begins with . . . ". The text may be rendered in a font specified in the formatting metadata and be rendered horizontally. The playlist would indicate when to display this picture.

Server 102 (or another server) then can provide the pictures to multiple user devices 104. This provides uniformity in the presentation of the captions. For example, different user devices 104 display the same picture that was generated by server 102, and thus the captions appear the same on the different user devices 104. The uniformity is thus preserved even though some user devices 104 have different software renderers and would normally render the text for the captions differently if given the same input. In addition to uniformity, the problems of some software renderers not having the capability to render some captions is avoided because user devices 104 render pictures instead of text. For example, if some user devices 104 cannot render Chinese/Japanese glyphs or render text vertically, these user devices 104 may still display pictures that include the glyphs or vertical text. Additionally, if other problems exist with user devices 104 not being able to render the captions, such as when media players cannot open a second stream to read textual data from text files, these user devices 104 may typically be able to receive and display pictures.

Particular embodiments provide captions out-of-band with corresponding video. For example, caption files and video files are sent through separate channels. The term out-of-band may mean that the captions are sent in a separate stream of information from the video and not multiplexed with the video. The caption file may include a series of pictures that display the text information for the captions. For example, a series of pictures with different subtitles may be included in a caption file 108. The pictures are pre-rendered in that the text information may be rendered into pictures that are stored in caption file 108 before user device 104 receives the pictures. In this case, user device 104 does not need to use a renderer to render text on video. Rather, user device 104 renders the pictures instead.

As described above, server 102 may stream video to user device 104. A media file manager 106 of server 102 receives a request from user device 104 for a media program. The media program may be associated with a video file 110 and a caption file 108 in storage 112. Although storage 112 is shown as being part of server 102, storage 112 may be remotely located in a database and accessed via a network. Audio may also be included in video file 110 or may be included in a separate file. Video file 110 includes a set of video frames. Caption files 108 and video files 110 may be stored separately in storage 112. That is, captions are not multiplexed with video.

Also, caption file 108 includes the pre-rendered pictures displaying corresponding captions for the video frames and is associated with a playlist that describes when to display the pictures with the video. Other metadata may also be included. For example, metadata is included that describes a location to render the picture, such as at certain coordinates. For example, the picture may be smaller than a size of a video frame. The picture is then overlaid on the video frame at a position. For example, the picture is rendered at the bottom of the video frame. In other examples, the picture may be a "full screen" picture and is overlaid over the entire video frame. In this case, the picture may be mostly transparent except for the text of the caption.

Media file manager 106 may retrieve a video file 110 and a corresponding caption file 108 based on the request. Media file manager 106 then streams caption file 108 and video file 110 to user device 104. As described above, pictures from caption file 108 are streamed out-of-band with video from the video file 110.

User device 104 includes a renderer 114 that receives the caption file 108 and video file 110, and renders the video and the pictures of captions on a media player 116. For example, renderer 114 may overlay a picture including a caption from caption file 108 over one or more frames of video from video file 110 based on a time in the playlist that indicates when to display the picture. This process may continue as pictures from caption file 108 are overlaid on corresponding video frames at applicable times. For example, a caption is displayed for a certain duration while video is being played in a media player 116. Because pictures of captions are sent, user device 104 does not need to render text on the video. Rather, pictures are overlaid on video. Also, because pictures are used, the formatting for the captions may be the same across different user devices 104. For example, the font, capitalization, location, or other formatting characteristics are the same when the pictures of captions are displayed on different user devices 104 because different user devices 104 overlay the same picture.

Figure 2:
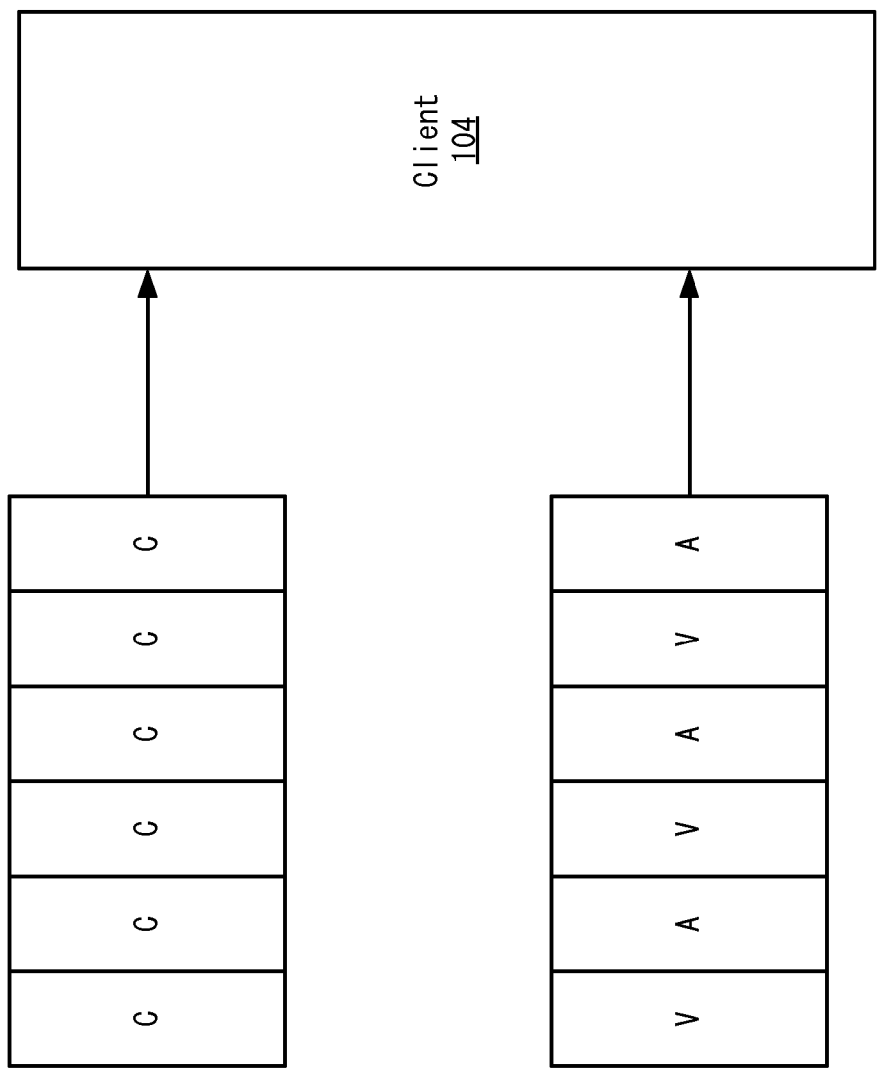
FIG. 2 depicts an example of a video file and a caption file according to one embodiment.

FIG. 2 depicts an example of a video file 110 and a caption file 108 according to one embodiment. As shown, video file 110 includes video (V) and audio (A) multiplexed together. In this case, renderer 114 would receive video file 110 and render video along with corresponding audio that is received in-band with each other.

Caption file 108 includes a series of pictures that include different captions (C). The pictures are sent out-of-band with respect to the video and audio of video file 110. When renderer 114 receives the pictures in caption file 108, renderer 114 renders the pictures with corresponding video and audio. For example, renderer 114 may render a first picture of a caption at a time 0:14 of the video and display the picture for 2 seconds. The location of where to render the picture may also be specified.

Because captions are delivered out-of-band with respect to video, changes to captions may be made without changing video file 110. For example, if the format of captions needs to be edited, the captions can be edited in caption file 108 without affecting video file 110. Further, if additional caption files 108 need to be added, such as for a different language, for the media program, a separate caption file 108 may be generated for a new language without affecting video file 110. However, if the captions were delivered in-band with the video, then captions for the new language would have to be multiplexed with the video and audio, and video file 110 would have to be edited. When video files 110 are encoded in multiple bit rates, then this multiplies the number of video files 110 that need to be edited as each video file 110 for each bit rate needs to be edited when captions are multiplexed in video file 110.

Figure 3:
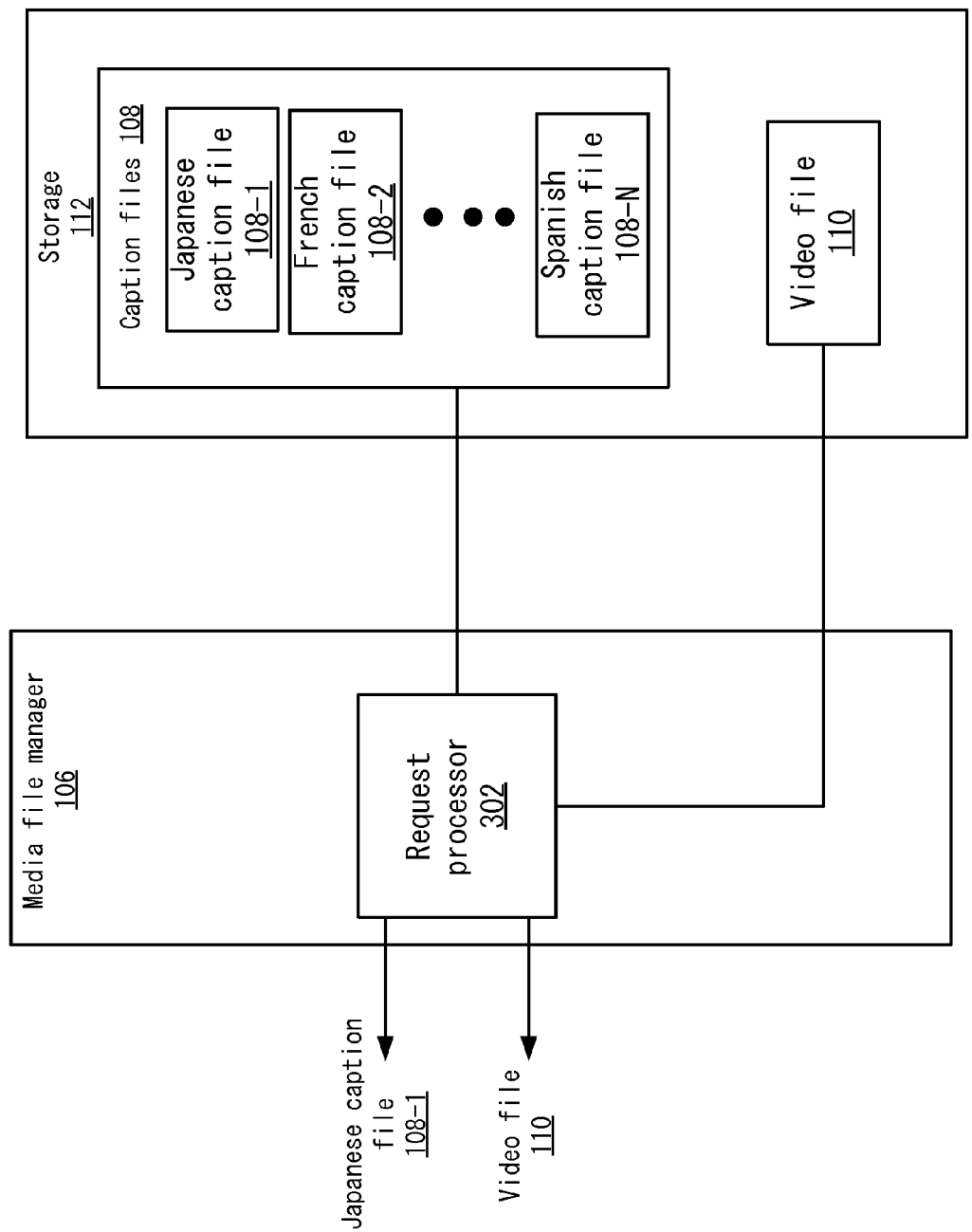
FIG. 3 depicts a more detailed example of media file manager according to one embodiment.

FIG. 3 depicts a more detailed example of media file manager 106 according to one embodiment. Media file manager 106 includes a request processor 302 that receives a request for a media program and can determine which video file 110 and which caption file 108 in storage 112 to stream to user device 104. For example, caption files 108 may include different files that correspond to video file 110. In one example, caption files 108 include captions for different languages for subtitles. Because caption file 108 is delivered out-of-band, only the requested caption file 108, such as the requested language for the subtitles, may be streamed to user device 104. Thus, captions for all languages do not need to be streamed as would be the case if captions for all languages were delivered in-band with video file 110.

Request processor 302 determines which caption file 108 is requested. For example, the request may include a parameter that indicates which language for subtitles is requested. Assuming Japanese is requested, request processor 302 retrieves video file 110 and caption file 108-1 for the Japanese language. Request processor 302 then streams video file 110 and caption file 108-1 to user device 104 in separate channels. Also, caption files 108-2-108-*n* do not need to be streamed to user device 104.

Figure 4:
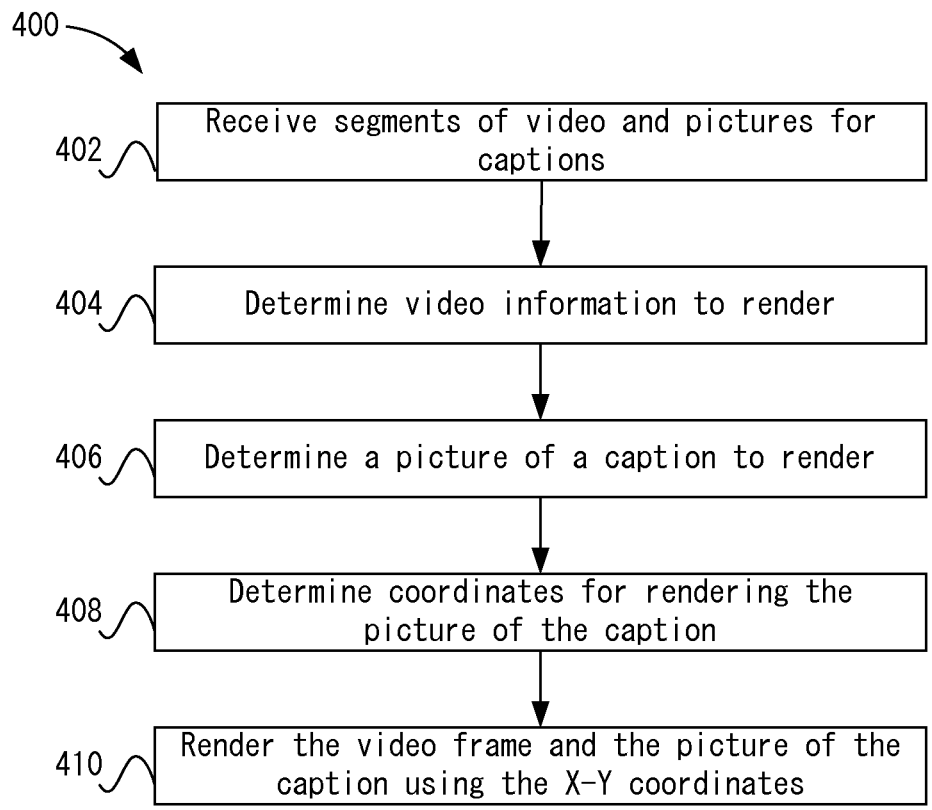
FIG. 4 depicts a simplified flowchart of a method for processing video files and caption files at a user device according to one embodiment.

FIG. 4 depicts a simplified flowchart 400 of a method for processing video files 110 and caption files 108 at user device 104 according to one embodiment. At 402, user device 104 receives segments of video and pictures for captions. For example, user device 104 may request segments of video and pictures of captions from server 102. In one example, each segment of video in video file 110 is requested along with each picture in caption file 108. The segments of video and the pictures may be requested based on a video playlist and a picture playlist. In another example, a segment of video is requested and a corresponding picture is also sent. User device 104 may request a range of video segments and pictures of captions, and buffer the received video segments and pictures of captions.

At 404, renderer 114 determines video information to render. For example, a frame of video is determined. At 406, renderer 114 determines a picture of a caption to render. For example, a picture of a caption may be associated with a time to display the picture along with a duration. For example, the caption may be displayed over a certain number of video frames or for a time period (e.g., 2 seconds). At 408, renderer 114 determines coordinates for rendering the picture of the caption. For example, X-Y coordinates may be provided for a location to render the picture. The picture may be placed at the bottom of the video, the side, the top, etc. In other examples, a full screen picture may be displayed without determining a location to render the picture. At 410, renderer 114 renders the video frame and the picture of the caption using the X-Y coordinates. The picture of the caption may be displayed for multiple video frames. The process then continues as renderer 114 renders video frames and pictures of captions.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:

storing, by a computing device, a set of visual representations of captions for a media program and video information for the media program, wherein text for the captions is rendered in the stored set of visual representations;

receiving, by the computing device, a plurality of first requests for segments of the video information for the media program from a user device, wherein the user device uses a video playlist to determine the segments of video information to request;

receiving, by the computing device, a plurality of second requests from visual representations of captions corresponding to the segments of the video information requested from the user device, wherein the user device uses a visual representation playlist to determine the visual representations of captions to request, wherein the video playlist is separate from the visual representation playlist; and in response to the plurality of first requests and the plurality of second requests, sending, by the computing device, the visual representations of captions from the set of visual representations of captions with the segments of the video information over a network to the user device, wherein text for the captions has been pre-rendered in the sent visual representations of captions before sending of the visual representations of captions to the user device and the user device is configured to directly render and overlay the visual representations of captions over at least a portion of segments of video information without rendering of the text for the captions on the segments of the video information at the user device.

2. The method of claim 1, further comprising generating, by the computing device, the set of visual representations of captions by pre-rendering the text for the captions into the visual representations of captions before sending of the visual representations of captions from the set of visual representations of captions to the user device.

3. The method of claim 1, wherein sending the visual representations of captions from the set of visual representations of captions with the video information comprises sending, by the computing device, the visual representations of captions from the set of visual representations of captions out of band with the segments of video information to the user device.

4. The method of claim 1, wherein the visual representations of captions that are displayed on a plurality of user devices that include renderers that render text differently are the same.

5. The method of claim 1, wherein the segments of video information are not multiplexed with the set of visual representations of captions.

6. The method of claim 1, wherein sending comprises sending, by the computing device, the visual representations of captions from the set of visual representations of captions in a separate channel from the segments of video information.

7. The method of claim 1, further comprising:
receiving, by the computing device, requests for the visual representations of captions and the segments of video information; and
sending, by the computing device, the requested visual representations of captions and the segments of video information when requested.

8. The method of claim 1, wherein:
the set of visual representations of captions are stored consecutively in a first file;
the segments of video information are stored consecutively in a second file; and
sending comprises sending, by the computing device, the visual representations of captions from the set of visual representations of captions in the first file and sending the segments of video information from the second file.

9. The method of claim 1, wherein a visual representation of a caption is rendered at a specified position over a segment of video information by the user device.

10. A non-transitory computer-readable storage medium containing instructions, that when executed, control a computer system to be configured for:
storing a set of visual representations of captions for a media program and video information for the media program, wherein text for the captions is rendered in the stored set of visual representations;
receiving a plurality of first requests for segments of the video information for the media program from a user device, wherein the user device uses a video playlist to determine the segments of video information to request;

receiving a plurality of second requests from visual representations of captions corresponding to the segments of the video information requested from the user device, wherein the user device uses a visual representation playlist to determine the visual representations of captions to request, wherein the video playlist is separate from the visual representation playlist; and in response to the plurality of first requests and the plurality of second requests, sending the visual representations of captions from the set of visual representations of captions with the segments of the video information over a network to the user device, wherein text for the captions has been pre-rendered in the sent visual representations of captions before sending of the visual representations of captions to the user device and the user device is configured to directly render and overlay the visual representations of captions over at least a portion of corresponding segments of video information without rendering of the text for the captions on the segments of the video information at the user device.

11. The non-transitory computer-readable storage medium of claim 10, further configured for generating the set of visual representations of captions by pre-rendering the text for the captions into the visual representations of captions before sending of the visual representations of captions from the set of visual representations of captions to the user device.

12. The non-transitory computer-readable storage medium of claim 10, wherein sending the visual representations of captions from the set of visual representations of captions with the video information comprises sending the visual representations of captions from the set of visual representations of captions out of band with the segments of video information to the user device.

13. The non-transitory computer-readable storage medium of claim 10, wherein the visual representations of captions that are displayed on a plurality of user devices that include renderers that render text differently are the same.

14. The non-transitory computer-readable storage medium of claim 10, wherein the segments of video information are not multiplexed with the set of visual representations of captions.

15. The non-transitory computer-readable storage medium of claim 10, wherein sending comprises sending the visual representations of captions from the set of visual representations of captions in a separate channel from the segments of video information.

16. The non-transitory computer-readable storage medium of claim 10, further configured for:
receiving requests for the visual representations of captions and the segments of video information; and
sending the requested visual representations of captions and the segments of video information when requested.

17. The non-transitory computer-readable storage medium of claim 10, wherein:
the set of visual representations of captions are stored consecutively in a first file;
the segments of video information are stored consecutively in a second file; and
sending comprises sending the visual representations of captions from the set of visual representations of captions in the first file and sending the segments of video information from the second file.

18. The non-transitory computer-readable storage medium of claim 10, wherein a visual representation of a caption is rendered at a specified position over a segment of video information by the user device.

19. A method comprising:
sending, by a first user device, a request for a media program to a server, the media program associated with a set of visual representations of captions;

receiving, by the first user device, visual representations of captions in the set of visual representations of captions with segments of video information over a network from the server;

determining, by the first user device, a visual representation of a caption to render from the received visual representations using a visual representation playlist;

determining, by the first user device, a segment of video information based on a video playlist, wherein the video playlist is separate from the visual representation playlist; and directly rendering and overlaying, by the first user device, the visual representation of the caption over at least a portion of the segment of video information without rendering of the text for the caption on the segment of video information at the user device, wherein text for the captions has been pre-rendered in the received visual representations of captions before receiving of the visual representations of captions at the user device.

20. The method of claim 19, further comprising determining a location on the segment of video information to render the visual representation of the caption, wherein the visual representation of the caption is overlaid at the location.

21. The method of claim 19, wherein the visual representation of the caption that is displayed on the first user device and a second user device is the same.

* * * * *